United States Patent [19]

Sakakiyama

[11] Patent Number: 4,674,610
[45] Date of Patent: Jun. 23, 1987

[54] SYSTEM FOR DECREASING CLUTCH CURRENT DURING A CHANGE OF RANGE IN AN INFINITELY VARIABLE TRANSMISSION

[75] Inventor: Ryuzo Sakakiyama, Tokyo, Japan

[73] Assignee: Fuji Jukogyo Kabushiki Kaisha, Tokyo, Japan

[21] Appl. No.: 693,711

[22] Filed: Jan. 23, 1985

[30] Foreign Application Priority Data

Jan. 31, 1984 [JP] Japan ................................. 59-15417

[51] Int. Cl.$^4$ ............................................. B60K 41/22
[52] U.S. Cl. .............................. 192/0.052; 192/0.075; 192/0.092; 192/3.56
[58] Field of Search ................. 192/0.052, 0.07, 0.075, 192/0.076, 0.092, 0.096, 3.54, 3.55, 3.56, 3.58, 3.61, 3.62, 21.5, 103 R

[56] References Cited

U.S. PATENT DOCUMENTS

| | | |
|---|---|---|
| 4,061,217 | 12/1977 | Toyota et al. ................... 192/0.052 |
| 4,248,333 | 2/1981 | Matsumoto et al. ............. 192/0.052 |
| 4,369,675 | 1/1983 | van Deursen ..................... 74/864 |
| 4,515,257 | 5/1985 | Takano et al. .................. 192/0.075 |
| 4,518,064 | 5/1985 | Windsor .......................... 192/3.58 |

FOREIGN PATENT DOCUMENTS

| | | | |
|---|---|---|---|
| 57-30620 | 2/1982 | Japan ............................. | 192/0.052 |
| 57-30619 | 2/1982 | Japan ............................. | 192/0.052 |
| 57-30621 | 2/1982 | Japan ............................. | 192/0.052 |

Primary Examiner—Lawrence Staab
Assistant Examiner—Dwight G. Diehl
Attorney, Agent, or Firm—Martin A. Farber

[57] ABSTRACT

A system for controlling an electromagnetic clutch for a vehicle having an infinitely variable transmission which has a high engine speed drive range (Ds range) for increasing the transmission ratio when selected. The system is provided with a control unit for producing a pulse train for controlling the clutch torque of the electromagnetic clutch. The duty ratio of the pulse train temporarily varies so as to decrease the clutch torque, when the Ds range is selected.

10 Claims, 10 Drawing Figures

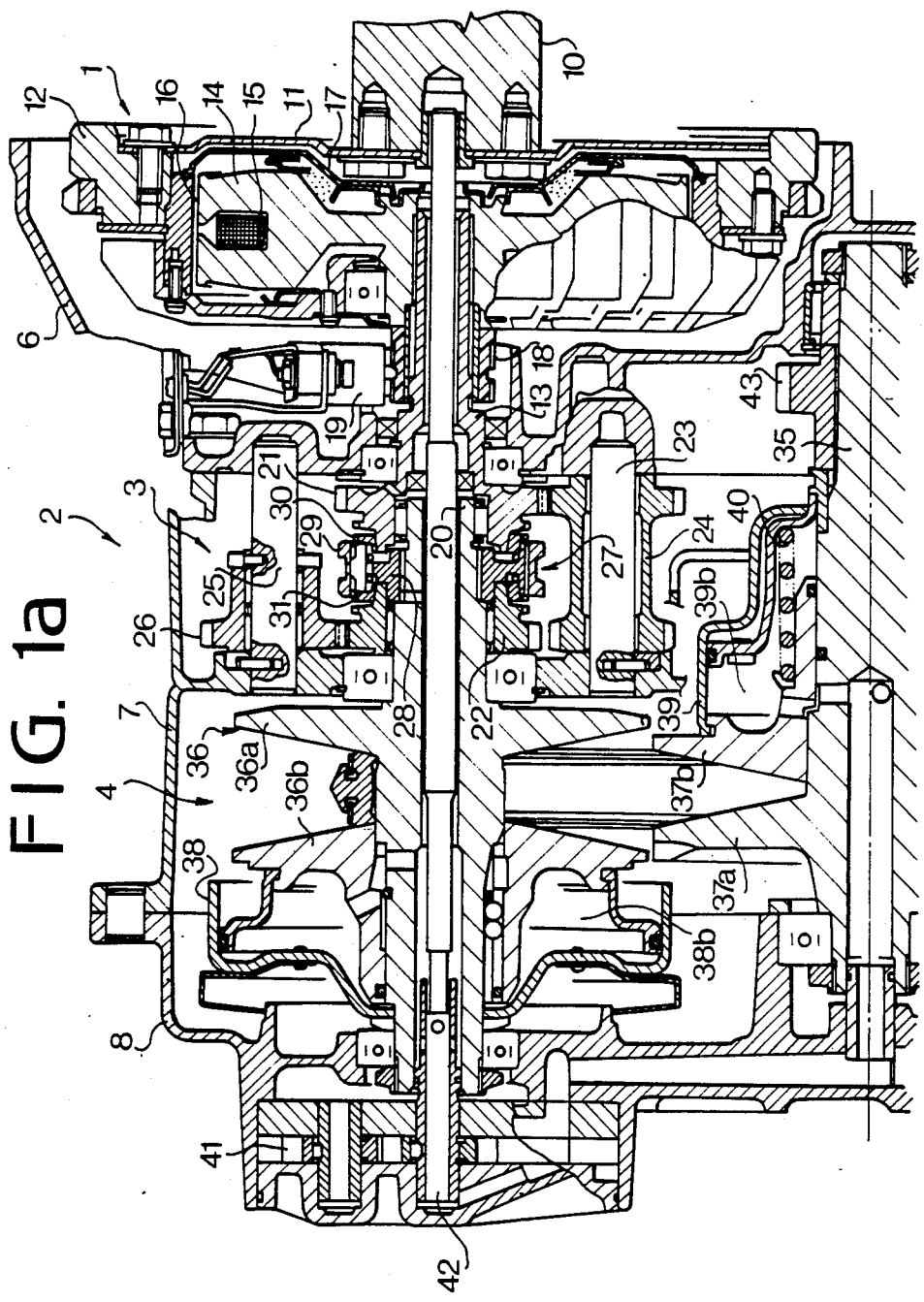

SYSTEM FOR DECREASING CLUTCH CURRENT DURING A CHANGE OF RANGE IN AN INFINITELY VARIABLE TRANSMISSION

BACKGROUND OF THE INVENTION

The present invention relates to a system for controlling an electromagnetic clutch for a vehicle having an infinitely variable belt-drive automatic transmission.

U.S. Pat. No. 4,401,199 discloses a system for controlling an electromagnetic clutch of an internal combustion engine mounted on a vehicle, in accordance with the engine speed and vehicle speed. Further, U.S. Pat. No. 4,369,675 discloses an infinitely variable belt-drive transmission for a vehicle. The transmission comprises an endless belt running over a driving pulley and a driven pulley, each pulley being so designed that the running diameter of the driving belt on the pulleys varies by a hydraulic control system. In the system, operational ranges such as a drive range (D range) and reverse range (R range) are provided. In addition, it has proposed to provide a high engine speed drive range (Ds range) in the infinitely variable belt-drive transmission. When the Ds range is selected while driving in the drive range, the transmission ratio is increased, so that increased speed of the engine to drive the vehicle can provide an active drive of the vehicle. In other words, the vehicle is driven in a high engine speed range. However, since the transmission ratio is increased in the Ds range, engine speed must be rapidly increased in order to keep the vehicle speed constant. Accordingly, if the engine speed is not rapidly or sufficiently increased to meet the downshifted transmission ratio, the vehicle speed is greatly decreased by the engine braking effect, which will cause a great shock.

SUMMARY OF THE INVENTION

The object of the present invention is to provide a system for controlling an electromagnetic clutch for an infinitely variable transmission having a Ds range, which may decrease a shock caused by engine braking upon selection of the Ds range.

In accordance with the present invention, the clutch torque of the electromagnetic clutch is temporarily decreased when the Ds range is selected, causing the slipping of the clutch which prevents shock.

According to the present invention, there is provided a system for controlling an electromagnetic clutch for a vehicle having an infinitely variable transmission which has a Ds range for increasing the transmission ratio when selected. The system comprises a Ds range switch responsive to the selection of the Ds range for producing a Ds range signal, and a control unit responsive to the Ds range signal for producing an output signal for a predetermined time for controlling the current passing in the electromagnetic clutch to decrease the clutch torque of the clutch.

In an aspect of the present invention, the output signal of the control unit is a pulse train, the duty ratio of which varies for gradually increasing the clutch torque.

In another aspect of the present invention, an accelerator pedal position switch is provided for producing an accelerator position signal when an accelerator pedal of the vehicle is depressed over a predetermined degree, and circuit means is provided to respond to the accelerator position signal for decreasing the predetermined time.

The other objects and features of this invention will became understood from the following description with reference to the accompanying drawings.

BRIEF DESCRIPTION OF DRAWINGS

FIGS. 1a and 1b are sectional views of an infinitely variable belt-drive transmission to which the present invention is applied;

DETAILED DESCRIPTION OF THE PREFERRED EMBODIMENT

Figure 1B:
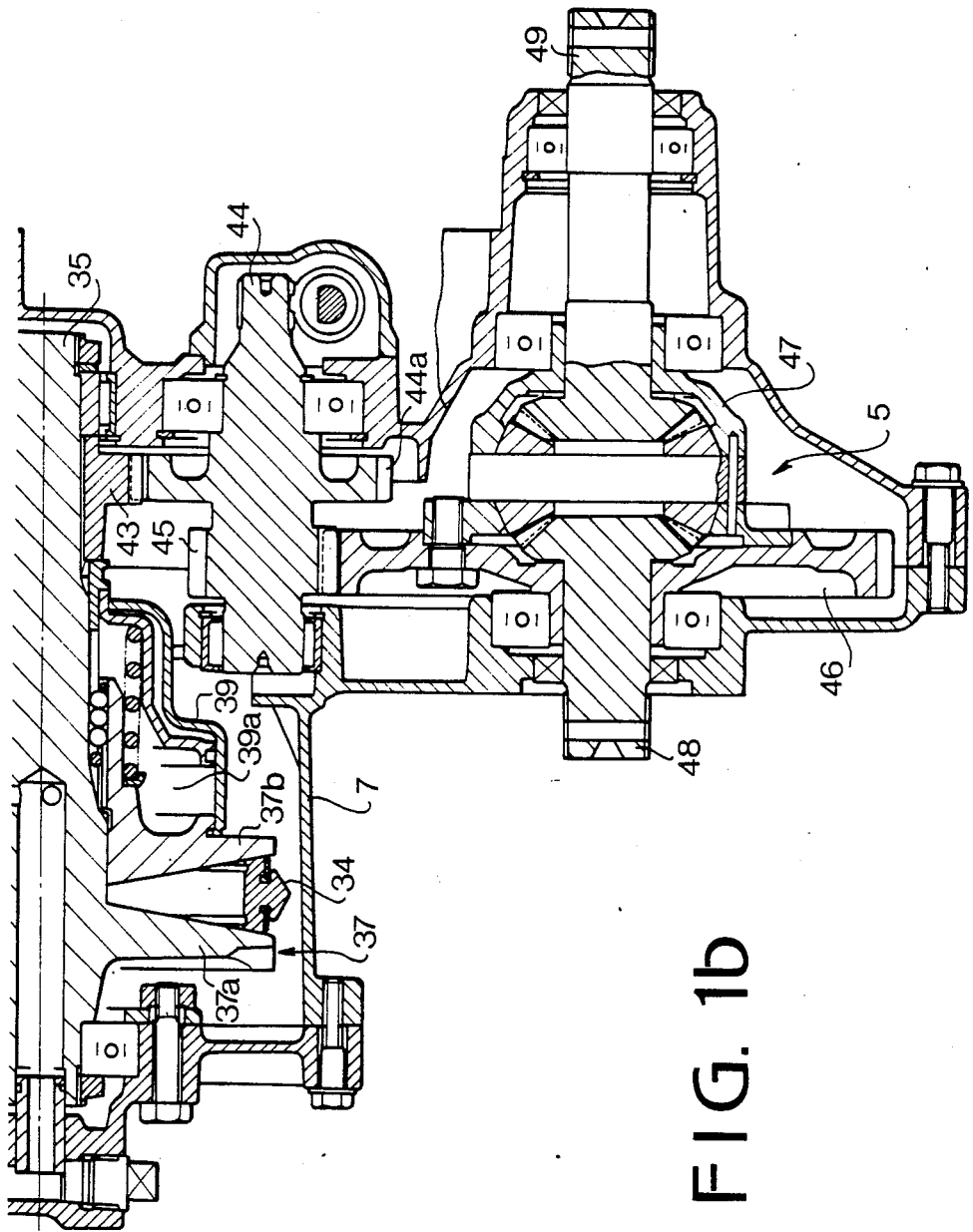

Referring to FIGS. 1a and 1b, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and a pressure oil control circuit (not shown). The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch comprises a driven member 14, and a magnetizing coil 15 provided in the driven member 14. The driven member 14 has its outer periphery spaced from the inner periphery of the drive member 12 by a gap 16, and a power chamber 17 is defined between the drive member 12 and driven member 14. Magnetic powder material is provided in the powder chamber 17. The driven member 14 is secured to an input shaft 13 of the belt-drive transmission. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through the rings 30 or 31.

At a neutral position (N range) or a parking position of a selector lever 65 (FIG. 2), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a driving range (D range) or a high engine speed drive range (Ds range).

When the sleeve 29 is engaged with the gear 22, the input shaft 13 is connected to the main shaft 20 through the gears 21, 24, 26 and, 22 and the synchronizer 27 to provide a reverse driving position (R range).

The main shaft 20 has an axial passage in which an oil pump driving shaft 42 connected to the crankshaft 10 is mounted. An output shaft 35 is provided in parallel with the main shaft 20. A drive pulley 36 and a driven pulley 37 are mounted on the shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 36 opposite the disc 36a. The movable conical disc 37b has a cylindrical portion in which a piston portion of the output shaft 35 is slidably engaged to form a servo device 39. A chamber of the servo device 39 is communicated with the oil pump 41 through the pressure oil control circuit. A spring 40 is provided to bias the movable conical disc 37b forward the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is tranmitted to axles 48 and 49 driving wheels of the vehicle through a differential 47.

The pressure oil control circuit is responsive to vehicle speed, engine speed and throttle valve position for controlling the oil from the oil pump 41 to the servo devices 38 and 39 thereby moving the discs 36c and 37b. Thus, the transmission ratio is infinitely changed. When the Ds range is selected, the transmission ratio is increased by the operation of the pressure oil control circuit.

Figure 2:
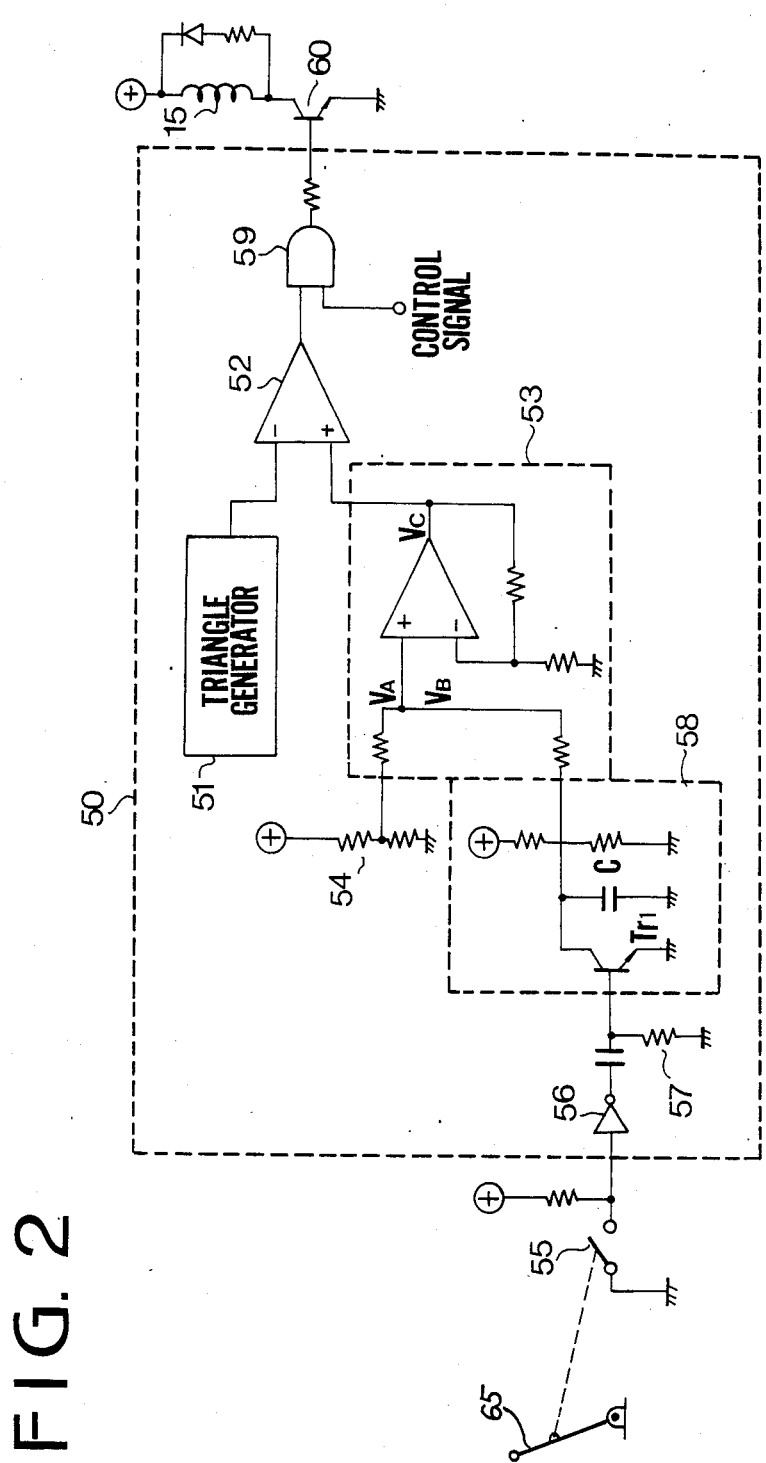
FIG. 2 is a control circuit according to the present invention.

Referring to FIG. 2, a Ds range switch 55 is provided to be turned on to produce a low level signal when the selector level 65 is shifted to the Ds range position. The Ds range switch 55 is connected to a reference voltage generating circuit 58 in a control unit 50 through an inverter 56 and a differentiation circuit 57. The reference voltage $V_B$ of the reference voltage generating circuit 58 and a voltage $V_A$ of a voltage divider 54 are applied to an adding circuit 53. The output voltage $V_C$ of the adding circuit 53 and a triangular pulse train from a triangle generator 51 are compared by a comparator 52. The output of the comparator 52 and a control signal are applied to an AND gate 59. The control signal is decided by vehicle speed and other conditions. The output of the AND gate 59 is applied to a base of a transistor 60 connected to the coil 15.

Figure 3:
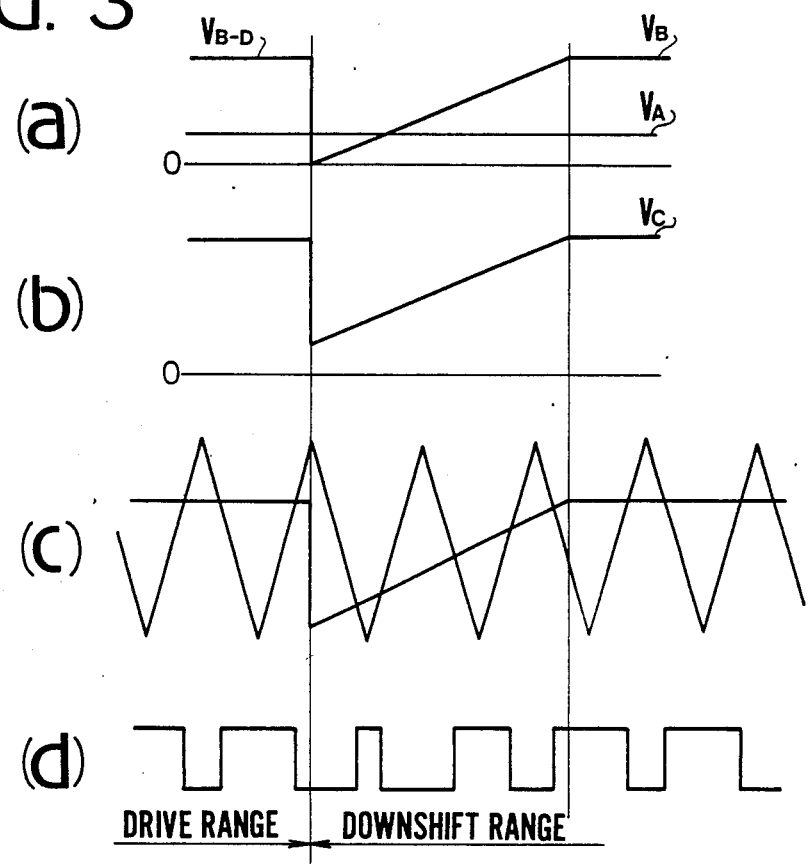
FIGS. 3 (a) to (d) show waveforms at various portions of FIG. 2.

As shown in FIGS. 3(c) and 3(d), the comparator 52 produces a rectangular pulse train (d). The duty ratio of the pulse train increases with the increase of the output voltage $V_C$ of the adding circuit 53. The more the duty ratio increases, the more the clutch current passing through the coil 15 and transistor 60 increases, that is the clutch torque increases.

Figure 4:
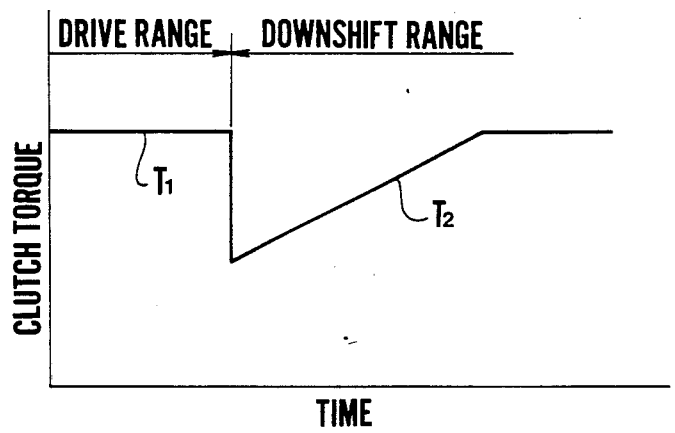
FIG. 4 is a graph showing clutch torque in the system of the present invention.

When the drive range is selected, the Ds range switch 55 is turned off, so that a high level voltage is produced. The high level voltage is inverted by the inverter 56, thereby turning off a transistor $Tr_1$ in the reference voltage generating circuit 58 to charge a capacitor C. Thus, the reference voltage $V_B$ is at a high level as shown by $V_B$-D in FIG. 3(a). Accordingly, the added voltage $V_C$ from the adding circuit 53 is also at a high level as shown in FIG. 3(b). Thus, the duty ratio of the pulse train from and AND gate 59 has a large value as shown in FIG. 3(d), providing a large cluch torque $T_1$ (FIG. 4) fully engaging the electromagnetic clutch 1.

When the Ds range is selected, the switch 55 is closed to produce a low level output which is inverted by inverter 56. The differentiation circuit 57 produces an output voltage having a sawtooth form. Accordingly, the transistor $Tr_1$ is temporarily turned on to discharge the capacitor C. Thus, the reference voltage $V_B$ rapidly decreases and then gradually increases with the charging of the capacitor C as shown in FIG. 3(a). Therefore, the duty ratio of the pulse train extremely decreases at the beginning of the Ds range, thereafter gradually increasing as shown in FIG. 3(d). Thus, the clutch torque varies, gradually increasing after a sudden decrease as shown by $T_2$ in FIG. 4.

The clutch 1 slips during the decrease of the clutch torque, so that engine braking does not occur. As the duty ratio increases, clutch engagement increases, effecting a smooth engine braking.

Figure 5:
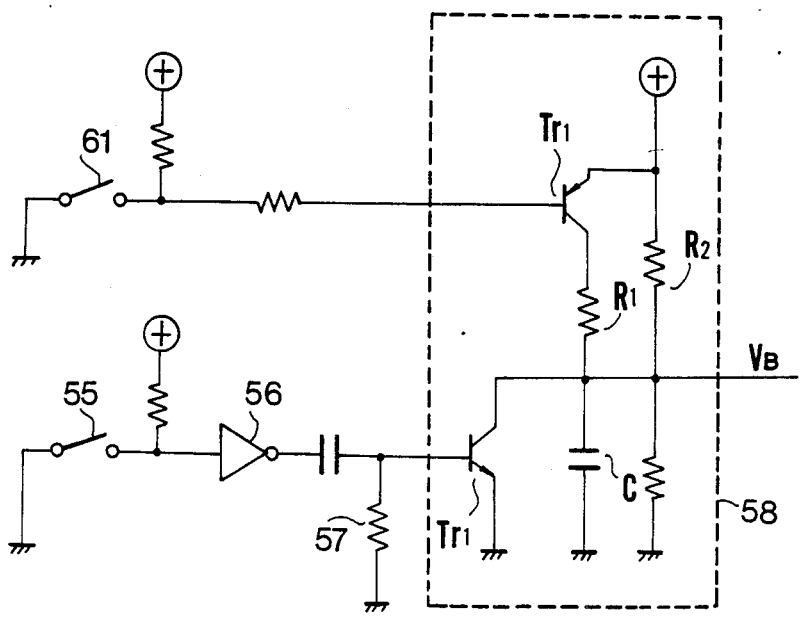
FIG. 5 shows another circuit of the present invention.

It will be understood that if engine speed is increased when the Ds range is selected, it is not necessary to decrease the clutch torque for a long time. In the circuit of FIG. 5, the period of small clutch torque is shortened when engine speed is increased by deep depression of an accelerator pedal (not shown), as described hereinafter.

Referring to FIG. 5, the capacitor C in the reference voltage generating circuit 58 is connected to the voltage source through a resistor $R_1$ and a transistor $Tr_2$ and through a resistor $R_2$ connected in parallel with the resistor $R_1$ and transistor $Tr_2$. The base of the transistor $Tr_2$ is connected to an accelerator pedal position switch 61 which is closed when an accelerator pedal of the vehicle is depressed over a predetermined degree. Other portions of the circuit are the same as the circuit of FIG. 2.

Figure 6:
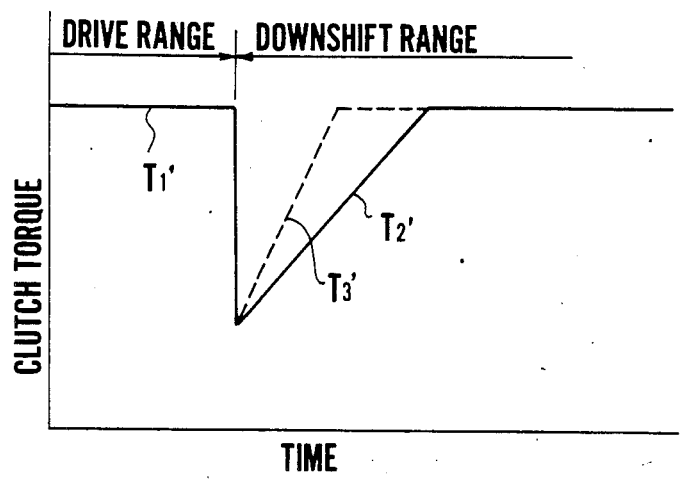
FIG. 6 is a graph showing clutch torque in the system of FIG. 5.

When the Ds range is selected in a small depression condition of the accelerator pedal, the capacitor C is charged through the resistor $R_2$ only, because the accelerator pedal position switch 61 is open turning off the transistor $Tr_2$. Accordingly, the cluch torque is decreased for a long time as shown by $T_2'$ in FIG. 6. To the contrary, when the accelerator pedal is deeply depressed over a predetermined degree, the switch 61 is closed to turn on the transistor $Tr_2$. Thus, the capacitor C is rapidly charged through resistors $R_1$ and $R_2$, so that the clutch torque increases to the rated value within a short time as shown by $T_3'$. Although the period of the small clutch torque is short, shock by engine braking does not occur, because of a high engine speed. Moreover, since the clutch slips at the beginning of the Ds range, engine speed can be rapidly increased by the depression of accelerator pedal.

It should be understood that the system of the present invention can also comprise a microcomputer system.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling an electromagnetic clutch for a vehicle having an infinitely variable transmission which has a forward driving range and a high engine speed drive range for increasing the transmission ratio of the transmission more than that of the forward driving range, and a selector lever for selecting the ranges, the system comprising:
   a high engine speed drive range switch responsive to selection of the high engine speed drive range for producing a Ds range signal;
   a control unit responsive to the Ds range signal for producing an output signal for a predetermined time for controlling current passing in the electromagnetic clutch to a partial, gradually increasing value to decrease clutch torque of the clutch to a partial, gradually increasing value for partially engaging the clutch when changing from the forward driving range to the high engine speed drive range 2. The system for controlling an electromagnetic clutch according to claim 1 wherein the output signal of the control unit is a pulse train.

3. The system for controlling an electromagnetic clutch according to claim 2, wherein the duty ratio of the pulse train varies for gradually increasing the partial value of the clutch torque.

4. The system for controlling an electromagnetic clutch according to claim 3 wherein the control unit comprises a reference voltage generating circuit responsive to the Ds range signal for changing the reference voltage therefrom, and a pulse train generating circuit for producing a pulse train dependent on the reference voltage.

5. The system for controlling an electromagnetic clutch according to claim 2 further comprising an accelerator pedal position switch for producing an accelerator position signal when an accelerator pedal of the vehicle is depressed over a predetermined degree, and circuit means responsive to the accelerator position signal for decreasing the predetermined time.

6. A system for controlling an electromagnetic clutch for a vehicle having an infinitely variable automatic transmission which has a forward driving range and a high engine speed drive range for increasing the transmission ratio of the transmission more than that of the forward driving range, a reverse driving range, and a neutral range, a selector level for selecting the ranges, and a control unit for controlling current passing in the electromagnetic clutch in accordance with driving conditions of the vehicle, the clutch providing clutch torque dependent on the current, the system comprising
   a high engine speed drive range switch responsive to selection of the high engine speed drive range from the forward driving range for producing a Ds range signal, and
   the control unit comprising pulse train generating means for producing a pulse train for providing the current passing in the electromagnetic clutch and circuit means responsive to the Ds range signal for changing the duty ratio of the pulse train for a predetermined time for decreasing the current passing in the electromagnetic clutch to a partial, gradually increasing value greater than zero to decrease the clutch torque of the clutch to a partial, gradually increasing value when changing from the forward driving range to the high engine speed driving range.

7. The system as set forth in claim 6, wherein said circuit means comprises,
   a differentiator responsive to said Ds range signal,
   a grounded transistor connected to said differentiator so as to be controlled by the latter, and
   an RC circuit connected across a voltage source and ground being connected to said transistor so as to be controlled by the latter and connected to said pulse train generating means.

8. The system as set forth in claim 7, wherein said circuit means further includes means for changing the resistance of said RC circuit so as to decrease said predetermined time when engine speed is increasing.

9. The system as set forth in claim 7, wherein said pulse train generating means comprises a triangle wave generator and a comparator connected to said triangle wave generator and to said RC circuit.

10. The system as set forth in claim 7, wherein said circuit means is connected so that said differentiator rapidly decreases the voltage at said RC circuit by turning said transistor on immediately upon occurrence of said Ds range signal and quickly thereafter turns off said transistor gradually increasing the voltage at said RC circuit.

* * * * *